Oct. 9, 1923.

G. F. MOHLMAN

FRYING AND ROASTING PAN COVER

Filed June 14, 1922

1,470,281

Inventor
G. F. Mohlman

By E. J. Fetherstonhaugh
Atty.

Patented Oct. 9, 1923.

1,470,281

UNITED STATES PATENT OFFICE.

GEORGE FREDERICK MOHLMAN, OF EDMONTON, ALBERTA, CANADA, ASSIGNOR OF ONE-HALF TO EDWARD HOWARD MOLSTAD, OF EDMONTON, ALBERTA, CANADA.

FRYING AND ROASTING PAN COVER.

Application filed June 14, 1922. Serial No. 568,222.

*To all whom it may concern:*

Be it known that I, GEORGE FREDERICK MOHLMAN, a subject of the King of Great Britain, and residing at the city of Edmonton, in the Province of Alberta, in the Dominion of Canada, have invented a new and useful Improvement in Frying and Roasting Pan Covers, of which the following is the specification.

My invention relates to improvements in frying and roasting pan covers, and consists of a cover having a number of vents for the purpose of allowing steam to escape and at the same time keeping the grease from spattering and turning it back over the meat, acting as a self baster.

With a cover of this design, all meats or vegetables can be properly cooked, the meats being properly browned on top and cooked through. By allowing the steam to escape the par-boiling effect is done away with, which would happen with a closed cover, and it also has the tendency to make the toughest meat very tender.

The device is very simple of construction and can be very cheaply manufactured, and is more fully hereinafter described and illustrated in the accompanying drawings, in which :—

Similar letters refer to similar parts throughout the various views.

Figure 1:
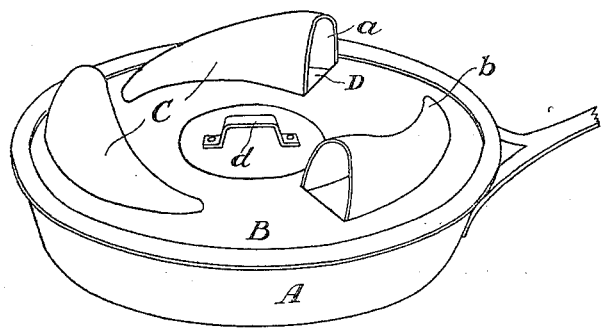
Fig. 1 is a perspective view of a frying pan with the cover in place and showing the arrangement of vents.
Figure 2:
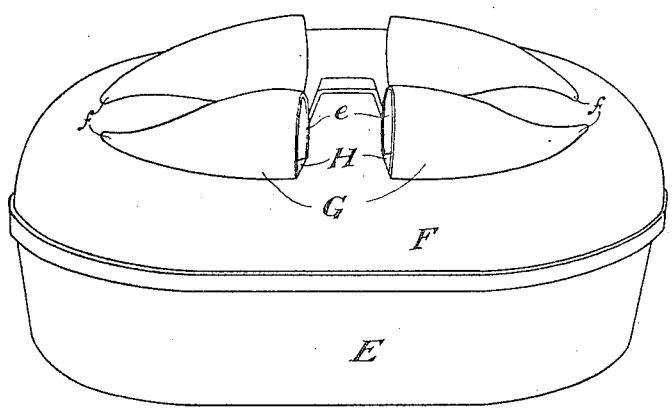
Fig. 2 is a perspective view of a roasting pan with the cover in place and showing the arrangement of vents.
Figure 3:
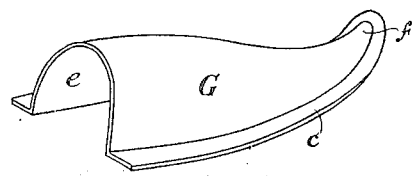
Fig. 3 is a perspective view of one of the hoods of the vents detached from the cover.

A is an ordinary frying pan having cover B with hoods of the vents C arranged thereon. The hoods of the vents C are formed in the shape of a half horn, having a sufficiently large opening at end $a$ and tapering down to a closed point at end $b$. Openings D the shape of the hoods of the vents C are formed in the cover B and to which the hoods of the vents are fitted. The hoods of the vents C have a flanged edge $c$ which fits underneath the cover, allowing the upper portion of the hoods of the vents to project through the openings D and are held in place by the flange $c$ being either riveted or soldered to the cover. $d$ is a handle attached to the cover for the lifting of same.

E is a roasting pan having a cover F with hoods of the vents G, in the shape of a half horn arranged thereon. The hoods of the vents G have a sufficiently large opening at end $e$ and taper down to a closed point at end $f$. The hoods of the vents G fit over the openings H and are held in place by the flange $c$ which fits underneath the cover and are either riveted or soldered to same.

On the circular frying pans the hoods of the vents are curved to suit the shape of the cover and face in the same direction. For square or oblong roasting pans the hoods of the vents are placed facing one another and are made to conform to the shape of the cover.

The hoods of the vents being horn shaped and tapering down to a point, catch the grease as it spatters from the pan and drains down again, thereby eliminating the waste of grease which takes place with an open pan.

With this style of pan the grease does not spatter all over the stove and the smell of coooking does not permeate through the house.

What I claim as my invention is :—

In a frying and roasting pan, a pan and a cover having hooded vents tapering in horn like shape from open mouths projecting upwardly from the cover.

Signed at the city of Edmonton, this 27th day of May 1922.

GEORGE FREDERICK MOHLMAN. [L. S.]

In the presence of—
GLADYS CUFF,
T. P. ROBARTS.